(12) United States Patent
Katz

(10) Patent No.: US 9,990,846 B1
(45) Date of Patent: Jun. 5, 2018

(54) DEVICE, SYSTEM AND METHOD FOR TRAFFIC MANAGEMENT

(71) Applicant: NoTraffic Ltd., Tel Aviv (IL)

(72) Inventor: Uriel Katz, Givatayim (IL)

(73) Assignee: NoTraffic Ltd., Tel Aviv (IL)

( * ) Notice: Subject to any disclaimer, the term of this patent is extended or adjusted under 35 U.S.C. 154(b) by 0 days. days.

(21) Appl. No.: 15/426,078

(22) Filed: Feb. 7, 2017

(51) Int. Cl.
*G08G 1/07* (2006.01)
*H04B 1/7073* (2011.01)
*G08G 1/056* (2006.01)

(52) U.S. Cl.
CPC .............. *G08G 1/07* (2013.01); *G08G 1/056* (2013.01); *H04B 1/7073* (2013.01); *H04B 2201/7073* (2013.01)

(58) Field of Classification Search
CPC ......... B60W 2420/42; B60W 2550/10; B60W 30/08; G01S 13/58; G01S 13/87; G01S 13/91; G05D 1/0274; G06K 9/00791; G06K 9/00805; G06T 2207/10016; G06T 2207/10021; G06T 2207/10028; G06T 2207/30236; G06T 2207/30241; G06T 2207/30261; G08G 1/087; H02J 7/0068; H05B 33/0857; H05B 33/0884; H05B 37/0272; H05B 37/0281
See application file for complete search history.

(56) References Cited

U.S. PATENT DOCUMENTS

| | | | |
|---|---|---|---|
| 2011/0109478 A1* | 5/2011 | Williamson | G08G 1/087 340/906 |
| 2015/0334269 A1* | 11/2015 | Yokota | H04N 5/232 382/103 |
| 2017/0067991 A1* | 3/2017 | Liu | G01S 13/58 |
| 2017/0111981 A1* | 4/2017 | Recker | H05B 37/0272 |
| 2017/0199523 A1* | 7/2017 | Barton-Sweeney | B60W 30/00 |

* cited by examiner

*Primary Examiner* — Fekadeselassie Girma
(74) *Attorney, Agent, or Firm* — Alphapatent Associates, Ltd; Daniel J. Swirsky

(57) ABSTRACT

Devices, systems and methods for adaptive traffic signaling, including at least one signal output unit, at least one processor to receive a first input from a traffic signaling control system, and to receive at least one second input from at least one external source, and a wireless communication module to allow communication between the at least one external source and the processor, wherein the processor is to control operation of the signal output unit based on the first input and second input.

19 Claims, 5 Drawing Sheets

DEVICE, SYSTEM AND METHOD FOR TRAFFIC MANAGEMENT

FIELD OF THE INVENTION

The present invention relates to traffic management. More particularly, the present invention relates to devices, systems and methods for adaptive traffic management.

BACKGROUND OF THE INVENTION

Currently, traffic is managed by multiple independent signaling units that manage traffic at a particular position or intersection by changing the signals, such as traffic-lights changing colors according to a particular timing schedule. Typically, each signaling unit (or traffic-light) is controlled by an intersection controller or a traffic signaling control system to turn on and off the signal and thereby manage the traffic.

For example, a traffic signaling control system can be coupled to an intersection traffic-light and control the timing of the light switching in the traffic-light according to predetermined timing schedules and/or other input. However, such systems required expensive infrastructure and hardware. Furthermore, existing systems require adapters in order to directly connect to intersection controller in order to control the signaling, as well as requirement of sensors to be installed separately for traffic jam detection.

SUMMARY OF THE INVENTION

There is thus provided, in accordance with some embodiments of the invention, an adaptive traffic signaling device, including at least one signal output unit, at least one processor connected to the at least one signal output unit, wherein the processor may receive a first input from a traffic signaling control system, and to receive at least one second input from at least one external source, and a wireless communication module, to allow communication between the at least one external source and the processor. In some embodiments, the processor may control operation of the signal output unit based on the first input and second input.

In some embodiments, the at least one signal output unit includes at least one light source to display at least one color. In some embodiments, the traffic signaling device includes a timing controller, including a Real-Time Clock (RTC), wherein the timing controller may receive clock synchronization signals via the wireless communication module, and wherein the timing controller may synchronize signal output of the at least one signal output unit, based on RTC output.

In some embodiments, the traffic signaling device includes a Global Navigation Satellite System (GNSS) module, wherein the timing controller is to receive clock synchronization signals via the GNSS module. In some embodiments, the traffic signaling device includes a rechargeable power source configured to be recharged by electrical signals received via the first input. In some embodiments, the traffic signaling device includes at least one sensor, coupled to the processor, and may detect objects in proximity to the traffic signaling device.

In some embodiments, the wireless communication module may transmit data to one or more remote recipient devices, in order to coordinate the operation of one or more traffic control systems. In some embodiments, the one or more traffic control systems includes at least one of: connected vehicles, traffic signaling devices, and navigation systems. In some embodiments, the processor may identify each detected object. In some embodiments, the processor may continuously determine a number of objects in proximity to the at least one signal output unit, based on signals received from the at least one sensor.

In some embodiments, the processor may calculate at least one object's parameter, wherein the at least one object's parameter consists of, at least one of: velocity, direction, object orientation, acceleration, type of object, and object identifier. In some embodiments, the processor may instruct a timing controller to automatically adjust timing schedules for each of the at least one signal output unit, based on at least two of first input, the calculated object's parameters, and the at least one second input.

In some embodiments, the traffic signaling device includes at least one memory module coupled to the processor, wherein the at least one memory module may store at least one of: current timing schedules, schedules history, sensor raw data, and historic data from external sources.

There is thus provided, in accordance with some embodiments of the invention, a method of adaptive traffic signaling, the method including receiving, by a processor of at least one adaptive traffic signaling device, a first input from a traffic signaling control system, receiving, by the processor, at least one second input from at least one external source, and controlling operation of a signal output unit of the at least one traffic signaling device, based on the first input and the second input.

In some embodiments, the method includes determining number of objects in proximity to the at least one signal output unit based on an output of at least one sensor. In some embodiments, the method includes receiving a traffic status parameter from at least one external server, wherein the controlling is also based on the received traffic status parameter. In some embodiments, the method includes receiving a clock synchronization signal, receiving at least one timing schedule, and synchronizing the signal output of the at least one signal output unit based on the clock synchronization signal and the timing schedule.

In some embodiments, the method includes receiving an output signal from at least another signal output unit, wherein the controlling is also based on the received output signal. In some embodiments, the method includes transmitting, via the wireless communication module, data to one or more remote recipient devices.

There is thus provided, in accordance with some embodiments of the invention, an adaptive traffic signaling system including at least two signal output units, in active communications therebetween, at least two processors connected to the at least two signal output units, wherein each processor may receive a first input from a traffic signaling control system, and to receive at least one second input from at least one external source, and a wireless communication module, to allow communication between the at least one external source and the at least two processors, and between the at least two signal output units. In some embodiments, at least one processor may control operation of the signal output units based on the first input, the second input, and data from other signal output units.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanying drawings in which:

Figure 1:
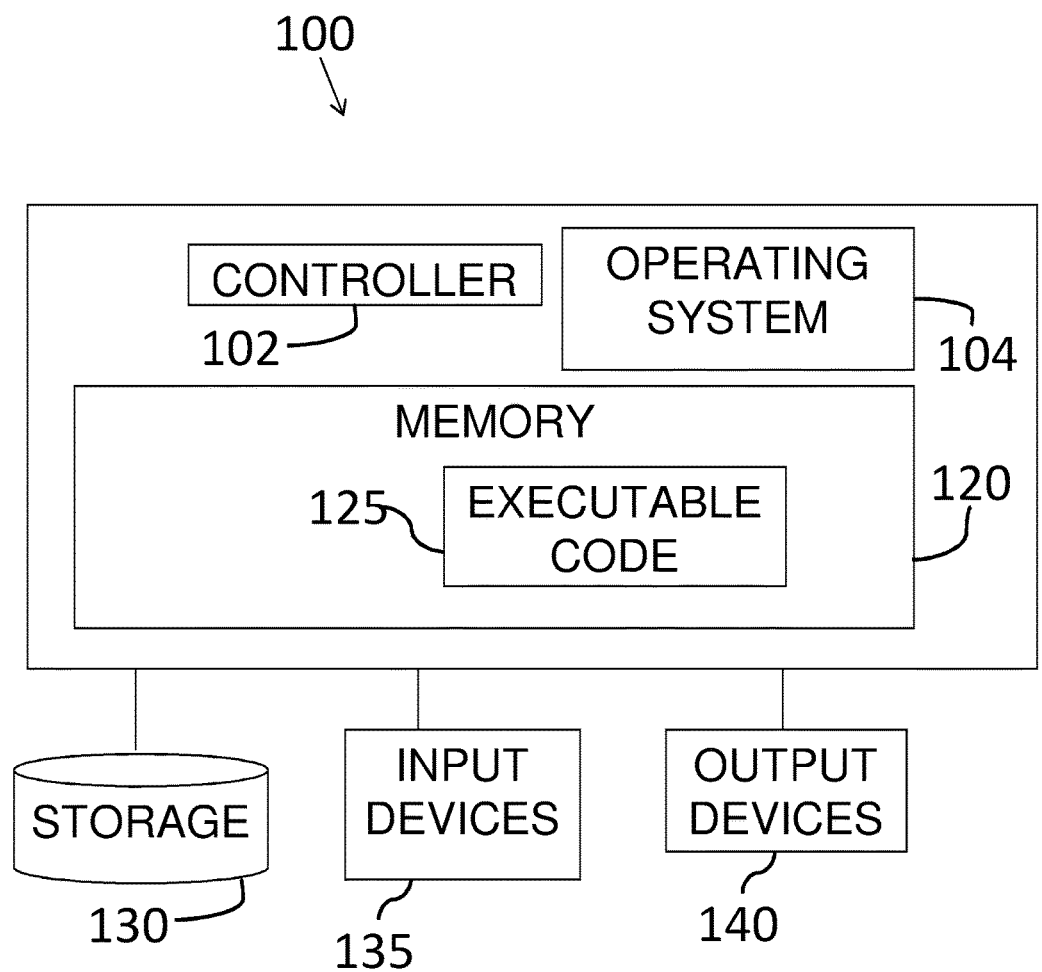
FIG. 1 shows a block diagram of an exemplary computing device, according to an embodiment of the present invention.

It will be appreciated that for simplicity and clarity of illustration, elements shown in the figures have not necessarily been drawn to scale. For example, the dimensions of some of the elements can be exaggerated relative to other elements for clarity, or several physical components may be included in one functional block or element. Further, where considered appropriate, reference numerals can be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention can be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which shows a block diagram of an exemplary computing device 100, according to some embodiments of the invention. Computing device 100 may include a controller 102 that may be, for example, a central processing unit processor (CPU), a chip or any suitable computing or computational device, an operating system 104, a memory 120, a storage 130, at least one input device 135 and at least one output device 140. Controller 102 may be configured to carry out methods as disclosed herein by for example executing code or software.

Operating system 104 may be or may include any code segment designed and/or configured to perform tasks involving coordination, scheduling, arbitration, supervising, controlling or otherwise managing operation of computing device 100, for example, scheduling execution of programs. Operating system 104 may be a commercial operating system. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 20 may be or may include a plurality of, possibly different memory units.

Executable code 125 may be any executable code, e.g., an application, a program, a process, task or script. Executable code 125 may be executed by controller 102 possibly under control of operating system 104. For example, executable code 125 may be an application for image processing to identify number of objects in a certain frame. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a video camera, RADAR sensor or any suitable input device. It will be recognized that any suitable number of input devices may be operatively connected to computing device 100 as shown by block 135. Output devices 140 may include one or more displays and/or any other suitable output devices to deliver a signal. It will be recognized that any suitable number of output devices may be operatively connected to computing device 100 as shown by block 140. Any applicable input/output (I/O) devices may be connected to computing device 100 as shown by blocks 135 and 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120, computer-executable instructions such as executable code 125 and a controller such as controller 102.

A system according to embodiments of the invention may include components such as, but not limited to, a plurality of central processing units (CPU) or any other suitable multi-purpose or specific processors or controllers such as GPU or DSP, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Figure 2:
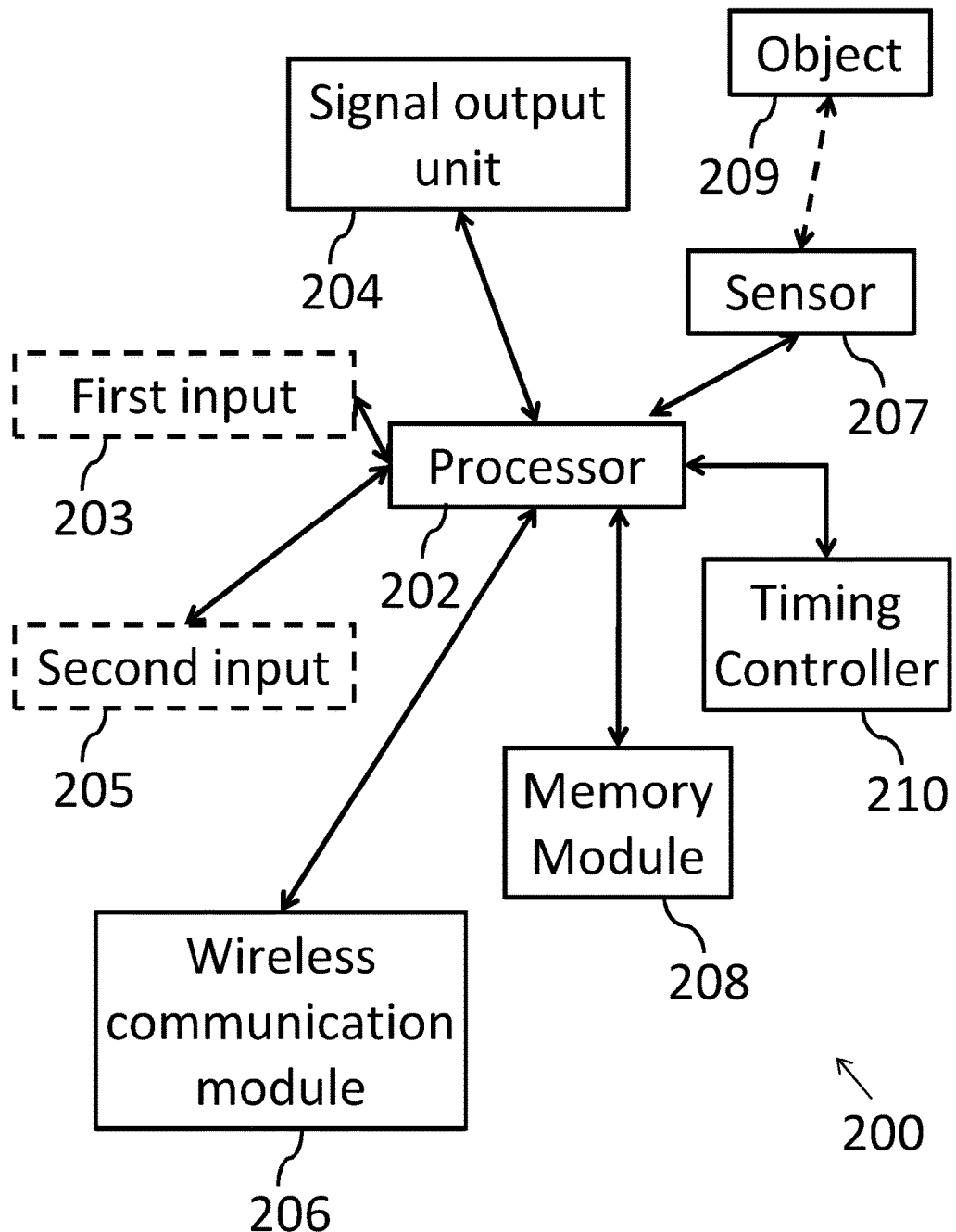
FIG. 2 shows a block diagram of a traffic signaling device, according to an embodiment of the present invention.

Reference is now made to FIG. 2, which shows a block diagram of a traffic signaling device 200, according to some embodiments of the invention. The direction of arrows in FIG. 2 may indicate the direction of data flow.

Traffic signaling device 200 may include at least one processor 202 (e.g., such as controller 102 in FIG. 1) and at least one signal output unit 204 operably coupled thereto. Traffic signaling device 200 may be autonomous and/or adaptive. In some embodiments, the at least one signal output unit 204 may include at least one light source to display at least one predetermined color. For example, a signal output unit 204 may replace one or more light bulbs of a traffic-light so as to output signals and thereby manage traffic, as further described hereinafter. In some embodiments, signal output unit 204 may output signal to computerized devices (e.g., autonomous cars) that are not visible to the drivers (e.g., RF signals) and thereby manage the traffic. It should be noted that an adaptive traffic signaling device 200 may be adaptive to incoming input, for example adaptive to receipt of new timing schedules from an external server.

Figure 3:
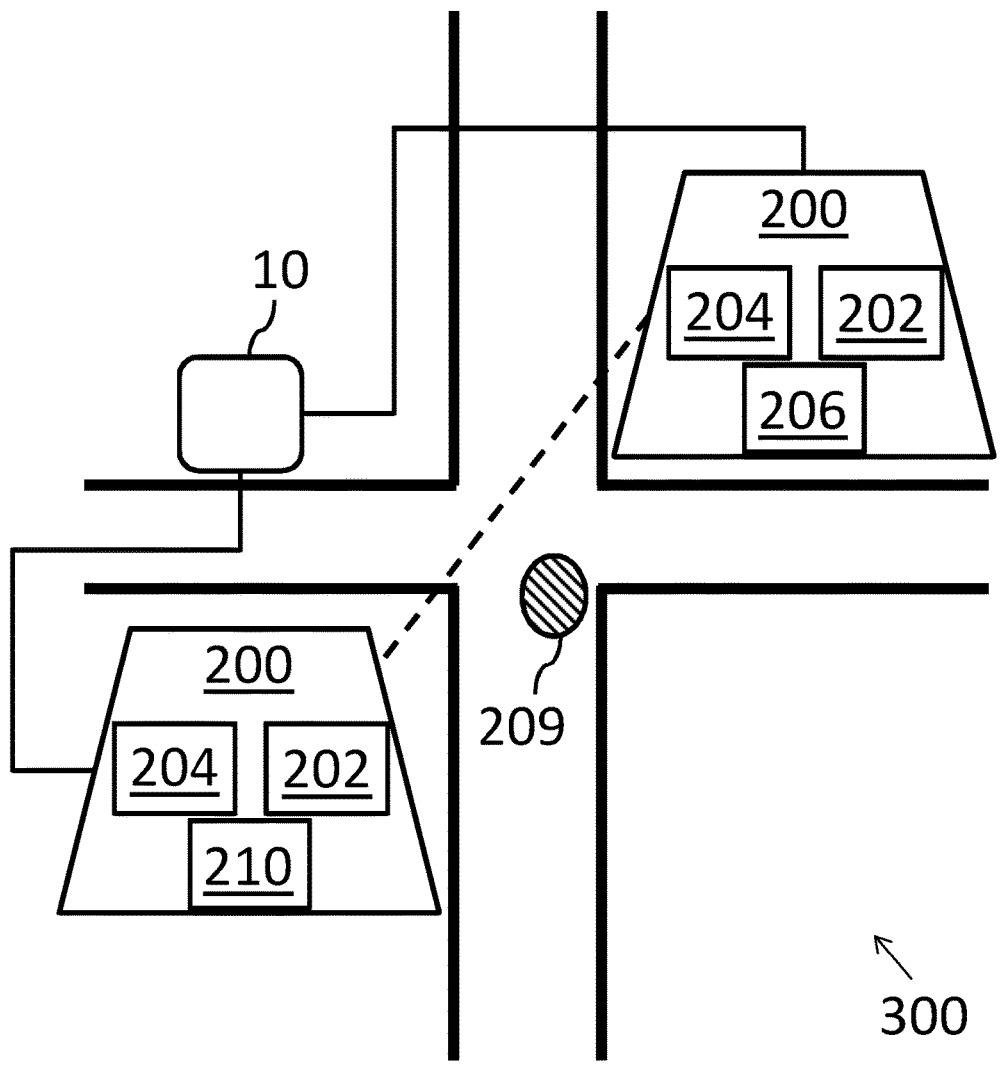
FIG. 3 schematically illustrates a traffic signaling system, according to an embodiment of the present invention.

In some embodiments, the processor 202 may receive a first input 203 from a traffic signaling control system (e.g., traffic signaling control system 10 as shown in FIG. 3), and may also receive at least one second input 205 from at least one external source. The processor 202 may control operation of the signal output unit based on the first input 203 and second input 205. For example, processor 202 may receive a first input 203 of timing schedules from a traffic signaling control system coupled to an existing traffic-light, and also receive a clock second input 205 from an external source, such as a server coupled to signaling device 200, a satellite navigation system coupled to signaling device 200, such as Global Positioning System (GPS), Global Navigation Satellite System (GLONASS) and/or BeiDou Navigation Satellite System (BEIDOU). In some embodiments, the processor may be coupled to a satellite navigation system (e.g., GPS, GLONASS or BEIDOU) and receive clock synchronization signals to synchronize signal output of the at least one signal output unit 204. In some embodiments, positioning information from the satellite navigation system may allow optimization of traffic management utilizing traffic status data for particular locations, for example receiving traffic status for a particular intersection (e.g., based on GPS positioning data) and changing signaling accordingly.

In some embodiments, traffic signaling device 200 may further include a wireless communication module 206, for instance to allow communication between the at least one external source and the processor 202. In some embodiments, the wireless communication module 206 may receive clock synchronization signals to synchronize signal output of the at least one signal output unit 204. In some embodiments, traffic signaling device 200 may further include an encryption module to encrypt data transferred between the processor 202 and the at least one external source.

In some embodiments, wireless communication module 206 may transmit data to one or more remote recipient devices, in order to coordinate the operation of one or more traffic control systems. In some embodiments, a traffic control system may be or may include at least one of: connected vehicles, traffic signaling devices, and navigation systems and applications.

According to some embodiments, traffic signaling device 200 may include a timing controller 210 to control signal timing of the at least one signal output unit 204. In some embodiments, an output signal of traffic signaling device 200 may be sent from timing controller 210 (and not from processor 202) such that the output signal may be independent of the wireless communication module 206. Thus, an output signal may be sent from timing controller 210 even when wireless communication is unavailable (e.g., due to infrastructure problems). Furthermore, such a traffic signaling device 200 may be protected against malicious hacking attempts (to control the signaling) via the wireless communication module 206 if the timing controller 210 is physically separate from the processor 202. In some embodiments, processor 202 and/or timing controller 210 may carry out at least one timing validation checks to make sure that timing command from processor 202 complies with timing preferences in timing controller 210, for example to insure that processor 202 is not hacked by a malicious party.

According to some embodiments, traffic signaling device 200 may further include at least one sensor 207, coupled to the processor 202, and configured to detect objects 209 in proximity to the traffic signaling device 200. Such objects 209 may be identified and associated to object types selected from the group consisting of: vehicles, pedestrians, and hazardous objects (e.g. obstacles on the road). In some embodiments, processor 202 may receive from the at least one sensor 207 sensor raw data, and may determine a number of objects 209 in proximity to the at least one signal output unit 204 (e.g., using object detection and recognition algorithms, such as object detection algorithms such a Convolutional Neural Networks (CNN), HOG SVM classifiers, blob tracking, etc.). In some embodiments, number of objects 209 may be determined, in proximity to the at least one signal output unit 204, for each frame if the sensor 207 is an imager In some embodiments, localization of at least one object 209 may be determined, e.g. in the frame/field of view of the sensor 207.

In some embodiments, the processor 202 may calculate at least one object's 209 parameter, such as velocity, direction, object orientation, acceleration, type of object (e.g., public transportation, private car etc.), and object identifier (e.g., license plate). In some embodiments, the sensor 207 may include at least one of: a video camera, a RADAR sensor, and LIDAR sensor. In some embodiments, one or more of the object's 209 parameters may be calculated based on comparison of two or more consecutive readings received from sensor 207 (e.g., two or more consecutive images obtained by a camera or a RADAR).

In some embodiments, the processor 202 may automatically adjust predetermined timing schedules for each of the at least one signal output unit 204, based on at least two of first input 203, the calculated object's 209 parameters, timing controller 210 and the at least one second input 205. For example, processor 202 may receive timing schedules as first input 203, real-time traffic jam data in predetermined proximity (e.g., 5 kilometers) to traffic signaling device 200 as second input 205, and image sensor 207 reading detecting that there are no vehicles waiting for a green light at the intersection so that there is no need to change the signaling of the signal output unit 204, and accordingly adjust the predetermined timing schedule. In another example, image sensor 207 may detect a vehicle approaching at a velocity greater than a predetermined threshold (e.g., over 80 kilometers per hour) such that the vehicle is unable to stop if signal output unit 204 changes signal to indicate the vehicle to stop, so in that scenario signal output unit 204 may wait until the speeding vehicle passes to change the signaling and thereby avoid a collision with other vehicle and/or object. In yet another example, processor 202 may receive timing schedules as first input 203, and real-time traffic jam data in predetermined proximity (e.g., 5 kilometers) to traffic signaling device 200 as second input 205 indicating that a traffic jam occurs in a nearby intersection so that signal output unit 204 may automatically restrict traffic flow in that direction (e.g., increasing time of red light in a traffic-light with timing controller 210) so as to reduce incoming traffic to that intersection and thereby reduce the traffic jam.

According to some embodiments, first input 203 may provide power for the operation of traffic signaling device 200. In one embodiment, traffic signaling device 200 may include a rechargeable power source to be recharged by electrical signals received via the first input 203. In some embodiments, traffic signaling device 200 may further include a user interface module to allow manual control of the at least one signal output unit 204.

According to some embodiments, traffic signaling device 200 may further include at least one memory module 208 coupled to the processor 202 to store at least one of: predetermined timing schedules, schedules history, sensor raw data, and historic data from external sources.

Reference is now made to FIG. 3, which schematically illustrates an traffic signaling system 300, according to some embodiments of the invention. The direction of arrows in FIG. 3 may indicate the direction of data flow.

According to some embodiments, traffic signaling system 300 may include at least two traffic signaling devices 200 with at least two signal output units 204 in active communications therebetween. In some embodiments, traffic signaling system 300 may include at least one processor (e.g., a processor 202 of a traffic signaling devices 200) connected to the at least two signal output units to receive a first input from a traffic signaling control system 10, and to receive at least one second input from at least one external source. The at least one processor may control operation of at least one signal output unit 204 based on the first input, the second input, and data from other signal output units 204.

It should be noted that traffic signaling devices 200 may only receive electrical power from traffic signaling control system 10, while communication between signal output units 204 may be wireless (indicated with a dashed line in FIG. 3).

In some embodiments, traffic signaling system 300 may further include a wireless communication module 206, to allow communication between the at least one external source and the at least one processor 202, and between the at least two signal output units 204.

In some embodiments, the at least one processor 202 may receive information regarding objects in traffic, such as vehicles in proximity to the traffic signaling devices 200 (e.g., detected by sensor 207) and/or in other locations to optimize the traffic flow by controlling the signals of the signal output units 204. For example, processor 202 may receive information from navigation algorithms and/or systems (e.g., Google Maps) that have data regarding traffic in various locations, and not only in proximity to the traffic signaling devices 200.

It should be noted that traffic signaling system 300 may operate completely automatically to manage traffic with an independent and distributed system (where each traffic signaling device 200 may be considered as a node) that allows access from each node to all data stored in the system. Traffic signaling system 300 may also allow control of all nodes via a single access point (e.g., each node, or a centralized server) via gossip and/or replication communication protocols for distributed systems. Thus, any node may share data (e.g., an image of a traffic jam near a traffic-light) in the distributed system. In some embodiments, data may be stored in a compressed format.

According to some embodiments, when at least two processors 202 are coupled to a distributed network (e.g., for a predetermined area such as an intersection) one processor may be selected as master or leader, for instance using a leader election algorithm. The leader processor may receive input data, via the wireless communication module 206, from (slave) processors 202, wherein such input data may include traffic status and/or number of objects near each traffic signaling device 200 such that the leader processor may create a timing plan based on the input data. In some embodiments, the leader processor may send the timing plan (e.g., timing signaling of each traffic-light in an intersection) to timing controllers coupled thereto for authentication and/or validation. In some embodiments, timing controllers that receive the timing plan may execute that plan on the signal output units, for example a timing controller may validate a timing plan and then control at least one signal output unit to execute signals according to that plan.

In some embodiments, each timing controller 210 may authenticate a timing signal (e.g., for a specific signal output units 204) with a unique signature such that timing signals received by the leader processor may be identified for their origin, and therefore allow leader validation on the received timing programs. It should be noted that such leader validation may assist in blocking tempering and/or hacking attempts to the system.

Figure 4:
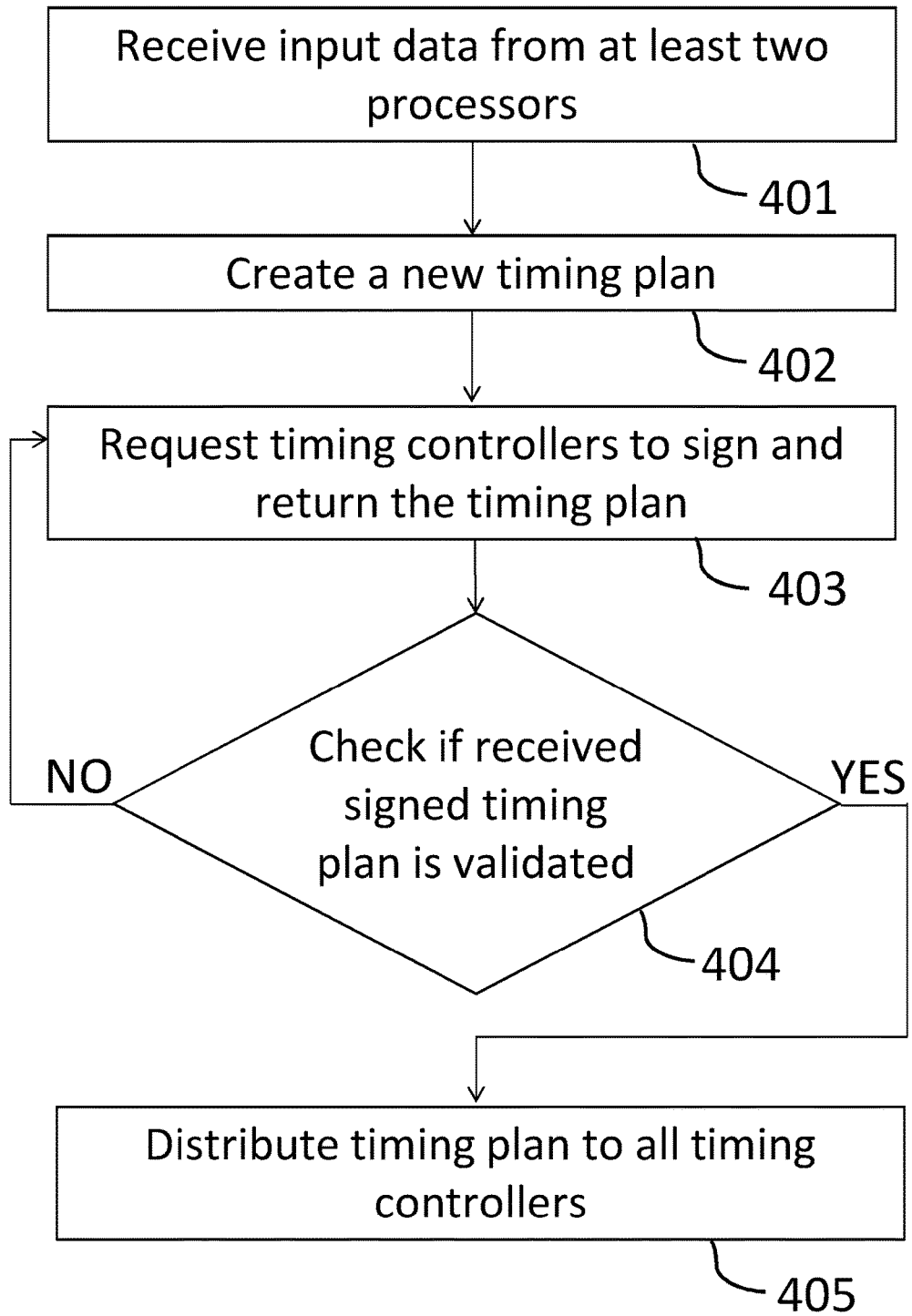
FIG. 4 shows a flow chart for a method of adaptive timing signaling, according to an embodiment of the present invention.

Reference is now made to FIG. 4, which shows a flow chart for a method of adaptive timing signaling, according to some embodiments of the invention. In some embodiments, a predetermined geographical area (e.g., an intersection with two traffic-lights) with at least two traffic signaling devices 200 may be considered as a distributed system, where one processor 202 may be selected as leader. The leader processor may receive 401 input data, for example number of objects near each traffic-light, from at least two processors 202 coupled to that distributed system. The leader processor may create 402 a new timing plan (e.g., proposed timing of signaling for each signal output unit 204) based on the received input data.

The leader processor may request 403 timing controllers 210 associated with the leader processor (e.g., in the same system for a particular intersection) to sign (and/or validate) and return the proposed timing plan to the leader processor. In some embodiments, a timing controller 210 may authenticate and/or sign a proposed timing plan if it complies with timing schedules of the corresponding processor and/or signal output unit 204.

In some embodiments, leader processor may receive signed timing plans from the corresponding timing controllers 210, and check 404 if received signed timing plan is validated. For example, leader processor may check if all timing controllers 210 associated with the leader processor sent signed timing plans. In case that the received signed timing plans are validated by the leader processor, the leader processor may distribute 405 the timing plan back to all timing controllers so as to execute at corresponding signal output units 204.

In case that the received signed timing plans are not validated by the leader processor, the leader processor may send another request 403 for timing controllers 210 associated with the leader processor to sign and return the proposed timing plan until the signed plans are validated by the leader processor. In some embodiments, at least one timing controller may check and/or validate that the received timing plan does not include conflicting commands, for example validate that two adjacent traffic-lights do not display green light simultaneously so as to avoid collision in an intersection.

Figure 5:
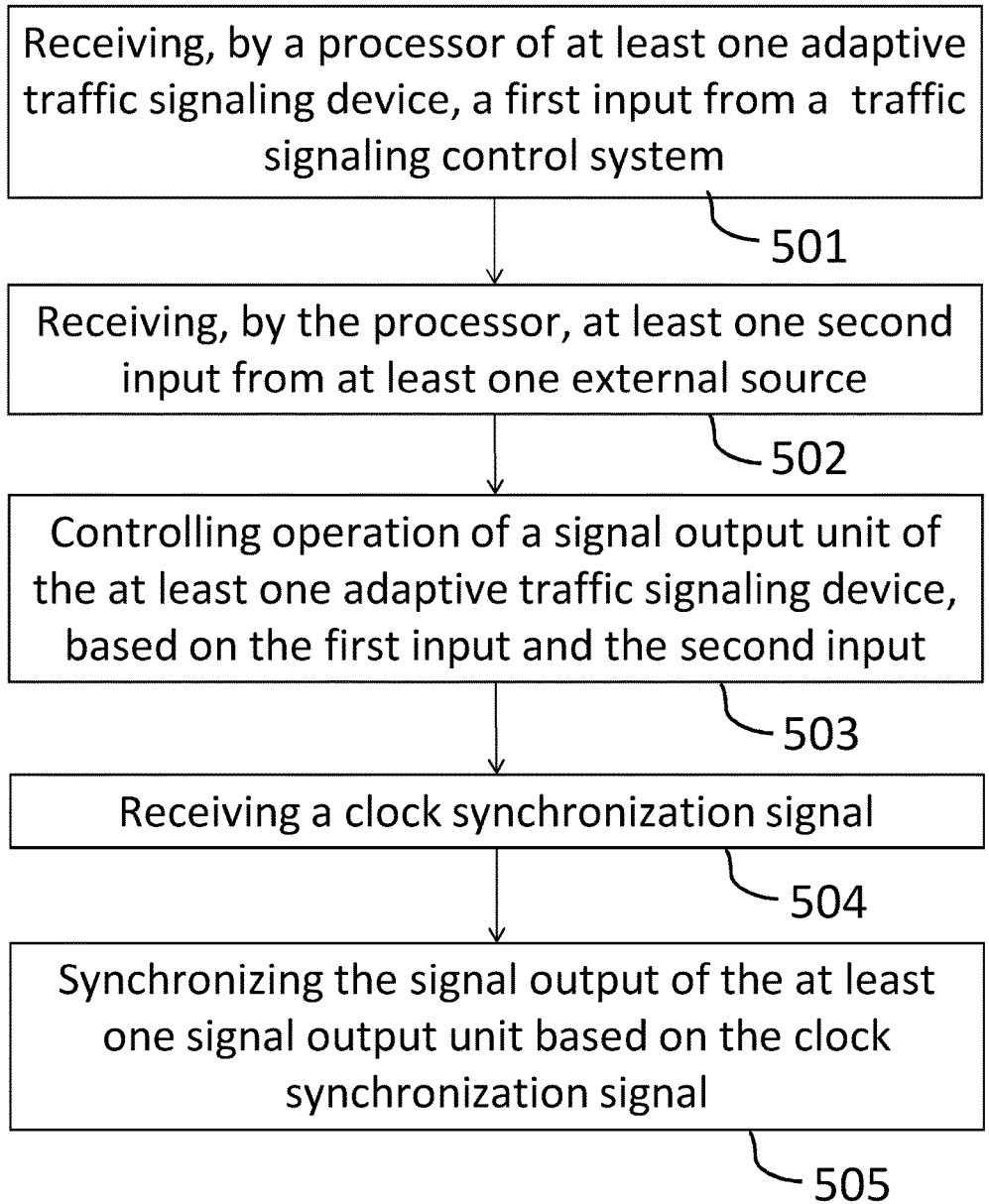
FIG. 5 shows a flow chart for a method of adaptive traffic signaling, according to an embodiment of the present invention.

Reference is now made to FIG. 5, which shows a flow chart for a method of adaptive traffic signaling, according to some embodiments of the invention. Some embodiments may include receiving 501, by a processor 202 of at least one traffic signaling device 200, a first input 203 from a traffic signaling control system 10 (e.g., as shown in FIG. 3). Some embodiments may include receiving 502, by the processor 202, at least one second input 205 from at least one external source.

Some embodiments may include controlling 503 operation of a signal output unit 204 of the at least one traffic signaling device 200, based on the first input 203 and the second input 205.

Some embodiments may include receiving 504 a clock synchronization signal, and synchronizing 505 the signal output of the at least one signal output unit 204 based on the clock synchronization signal.

Some embodiments may include determining amount and/or type and/or location of objects 209 in proximity to the at least one signal output unit 204 with at least one sensor 207. Some embodiments may include receiving a traffic status parameter from at least one external server, wherein the controlling may also be based on a timing schedule. Some embodiments may include receiving an output signal from at least one signal output unit 204, wherein the controlling may also be based on the received output signal.

Some embodiments may include receiving at least one timing schedule and synchronizing the signal output of the at least one signal output unit 204 based on the timing schedule. Some embodiments may include transmitting, via the wireless communication module 206, data to one or more remote recipient devices. In some embodiments, data transmitted to the one or more remote recipient devices may include at least one of: expected signal output in predefined time intervals and/or current signal output. In some embodiments, the one or more remote recipient devices may be selected from the group consisting of: a user computing device, a traffic signaling unit, a remote server, and a vehicle.

Unless explicitly stated, the method embodiments described herein are not constrained to a particular order in time or chronological sequence. Additionally, some of the described method elements can be skipped, or they can be repeated, during a sequence of operations of a method.

Various embodiments have been presented. Each of these embodiments can of course include features from other embodiments presented, and embodiments not specifically described can include various features described herein.

The invention claimed is:

1. An adaptive traffic signaling system, comprising:
   at least two adaptive traffic signaling devices, wherein each adaptive traffic signaling device includes
      at least one signal output unit,
      a processor connected to the at least one signal output unit, wherein the processor is configured to receive a first input from a traffic signaling control system, and to receive at least one second input from at least one external source,
      a timing controller that is physically separate from the processor, wherein the timing controller is configured to
         receive a timing command from the processor to control signal timing of the at least one signal output unit,
         perform a timing validation check to ensure that the timing command complies with timing preferences maintained by the timing controller, and
         control signal timing of the signal output unit in compliance with the timing command if the timing command complies with the timing preferences, and
      a wireless communication module, to allow communication between the at least one external source and the processor, wherein the processor is configured to control operation of the at least one signal output unit based on the first input, the second input, and data from other signal output units,
   wherein the adaptive traffic signaling devices are configured to communicate therebetween,
   wherein one of the adaptive traffic signaling devices is designated as a leader with respect to all of the other adaptive traffic signaling devices,
   wherein the leader adaptive traffic signaling device is configured to
      send a timing plan to all of the other adaptive traffic signaling devices,
      receive signed copies of the timing plan from all of the other adaptive traffic signaling devices indicating acceptance of the timing plan by all of the other adaptive traffic signaling devices, and
      resend the accepted timing plan to all of the other adaptive traffic signaling devices for execution of the accepted timing plan by the timing controllers of all of the other adaptive traffic signaling devices, and
   wherein all of the adaptive traffic signaling devices are configured to authenticate the timing plan when received.

2. The system of claim 1, wherein the at least one signal output unit comprises at least one light source to display at least one color.

3. The system of claim 1, wherein the timing controller comprises a Real-Time Clock (RTC), is configured to receive clock synchronization signals via the wireless communication module, and is configured to synchronize signal output of the at least one signal output unit, based on RTC output.

4. The system of claim 3, wherein any of the devices further comprises a Global Navigation Satellite System (GNSS) module, wherein the timing controller is to receive clock synchronization signals via the GNSS module.

5. The system of claim 1, wherein any of the devices further comprises a rechargeable power source configured to be recharged by electrical signals received via the first input.

6. The system of claim 1, wherein the wireless communication module in any of the devices is configured to transmit data to one or more remote recipient devices, in order to coordinate the operation of one or more traffic control systems.

7. The system according to claim 6, wherein the one or more traffic control systems comprise at least one of: connected vehicles, traffic signaling devices, and navigation systems.

8. The system of claim 1, further comprising at least one sensor, coupled to the processor, and configured to detect objects in proximity to any of the traffic signaling devices.

9. The system of claim 8, wherein the processor is further configured to identify each detected object.

10. The system of claim 8, wherein the processor is configured to continuously determine a number of objects in proximity to the at least one signal output unit, based on signals received from the at least one sensor.

11. The system according to claim 8, wherein the processor is configured to calculate at least one object's parameter, wherein the at least one object's parameter consists of, at least one of: velocity, direction, object orientation, acceleration, type of object, and object identifier.

12. The system of claim 11, wherein the processor is configured to instruct the timing controller to automatically adjust timing schedules for each of the at least one signal output unit, based on at least two of first input, the calculated object's parameters, and the at least one second input.

13. The system of claim 1, further comprising at least one memory module coupled to the processor, wherein the at least one memory module is configured to store at least one of: current timing schedules, schedules history, sensor raw data, and historic data from external sources.

14. A method of adaptive traffic signaling, the method comprising:
receiving, by a processor of at least one adaptive traffic signaling device of a plurality of cooperating adaptive traffic signaling devices, a first input from a traffic signaling control system;
receiving, by the processor, at least one second input from at least one external source;
controlling operation of at least one signal output unit of the at least one traffic signaling device, based on the first input and the second input, by sending, to a timing controller of the at least one adaptive traffic signaling device, wherein the timing controller is physically separate from the processor, a timing command to control signal timing of the at least one signal output unit;
receiving, by the timing controller, the timing command from the processor;
performing, by the timing controller, a timing validation check to ensure that the timing command complies with timing preferences maintained by the timing controller; and
controlling, by the timing controller, signal timing of the at least one signal output unit in compliance with the timing command if the timing command complies with the timing preferences,
wherein the controlling by the timing controller is performed subsequent to a designated leader of the plurality of cooperating adaptive traffic signaling devices sending a timing plan to all of the other adaptive traffic signaling devices,
receiving signed copies of the timing plan from all of the other adaptive traffic signaling devices indicating acceptance of the timing plan by all of the other adaptive traffic signaling devices, and
resending the accepted timing plan to all of the other adaptive traffic signaling devices for execution of the accepted timing plan by the timing controllers of all of the other adaptive traffic signaling devices, and
wherein the controlling by the timing controller is performed subsequent to all of the adaptive traffic signaling devices authenticating the timing plan when received.

15. The method of claim 14, further comprising determining, by the processor, number of objects in proximity to the at least one signal output unit based on an output of at least one sensor.

16. The method of claim 14, further comprising receiving, by the processor, a traffic status parameter from at least one external server, wherein the controlling by the timing controller, is also based on the received traffic status parameter.

17. The method of claim 14, further comprising:
receiving, by the processor, a clock synchronization signal;
receiving, by the processor, the at least one timing schedule; and
synchronizing, by the timing controller, the signal output of the at least one signal output unit based on the clock synchronization signal and the timing schedule.

18. The method of claim 14, further comprising receiving, by the processor, an output signal from at least another signal output unit, wherein the controlling by the timing controller, is also based on the received output signal.

19. The method according to claim 14, further comprising transmitting, via a wireless communication module, data to one or more remote recipient devices.

* * * * *